United States Patent [19]

Coerper, Jr. et al.

[11] Patent Number: 4,716,843
[45] Date of Patent: Jan. 5, 1988

[54] WASTE FUEL COMBUSTION SYSTEM

[75] Inventors: Philip R. Coerper, Jr., West Allis; Mark G. Parish, Brown Deer, both of Wis.

[73] Assignee: Aqua-Chem, Inc., Milwaukee, Wis.

[21] Appl. No.: 926,094

[22] Filed: Nov. 3, 1986

[51] Int. Cl.⁴ .............................................. F23B 7/00
[52] U.S. Cl. .................... 110/234; 110/238; 122/149; 236/15 E
[58] Field of Search ................ 122/149; 110/234, 238; 236/15 E; 431/190

[56] References Cited

U.S. PATENT DOCUMENTS

| | | | |
|---|---|---|---|
| 1,151,127 | 8/1915 | Schroder | 122/149 |
| 1,751,534 | 3/1930 | Taylor | 122/149 |
| 3,494,309 | 2/1970 | Hines et al. | 110/238 R |
| 3,718,102 | 2/1973 | Hemsath . | |
| 3,748,080 | 7/1973 | Dunn | 431/190 X |
| 3,805,714 | 4/1974 | Sharpe . | |
| 3,875,357 | 4/1975 | Foster et al. . | |
| 3,894,833 | 7/1975 | Rinecker . | |
| 3,980,416 | 9/1975 | Goncalves et al. | 431/190 X |
| 3,980,417 | 9/1975 | Dierckx . | |
| 4,054,097 | 10/1977 | Barkhuus . | |
| 4,097,218 | 6/1978 | Womack | 236/15 E |
| 4,453,476 | 6/1984 | Erlandsson | 110/238 X |
| 4,627,388 | 12/1986 | Buice | 122/149 |
| 4,628,835 | 12/1986 | Wollner | 110/238 |

Primary Examiner—Edward G. Favors
Attorney, Agent, or Firm—John C. Cooper, III; Fred Wiviott; C. Thomas Sylke

[57] ABSTRACT

A system for utilizing a fuel having a high ash content, water content in excess of 50% and large particles of combustibles is shown which includes a holding tank for the fuel. Fuel is circulated in the holding tank to maintain the consistency of the fuel and a metered portion is removed, strained and fed to a combustion device. The combustion device is a fire tube boiler for generating steam and includes a furnace tube insulated with refractory material extending for its entire length. The system mixes a preselected amount of atomized fuel with combustion air and natural gas. Special ash and particulate accumulation means are provided in the boiler. The boiler also has a water spraying system in its combustion chamber to reduce combustion temperature and increases water content of the combustion mixture based on the temperature of the combustion gases at the end of the furnace tube. Finally, when the boiler is shut off, the entire system, including a bypass system, may be purged by air or water.

25 Claims, 5 Drawing Figures

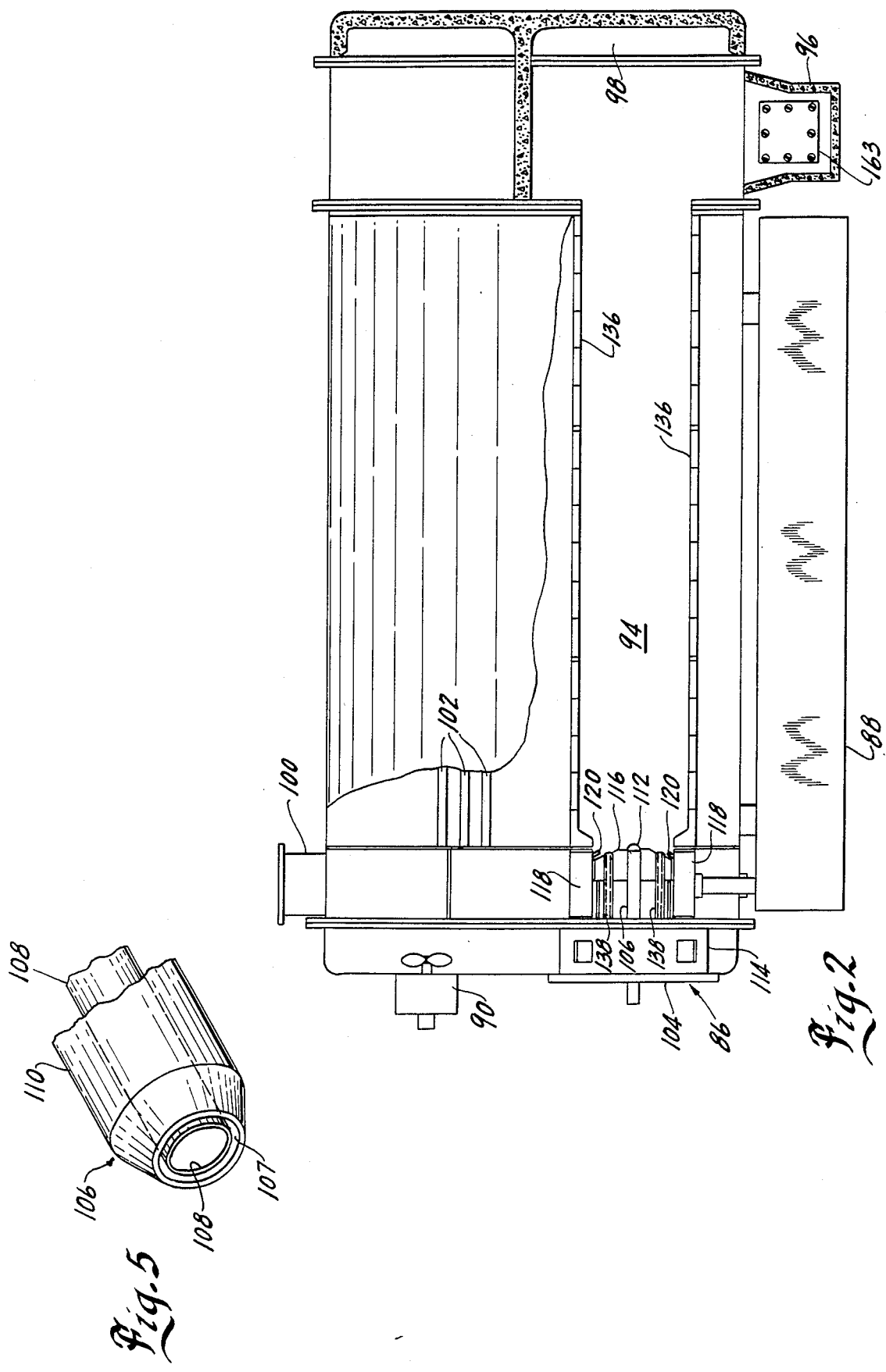

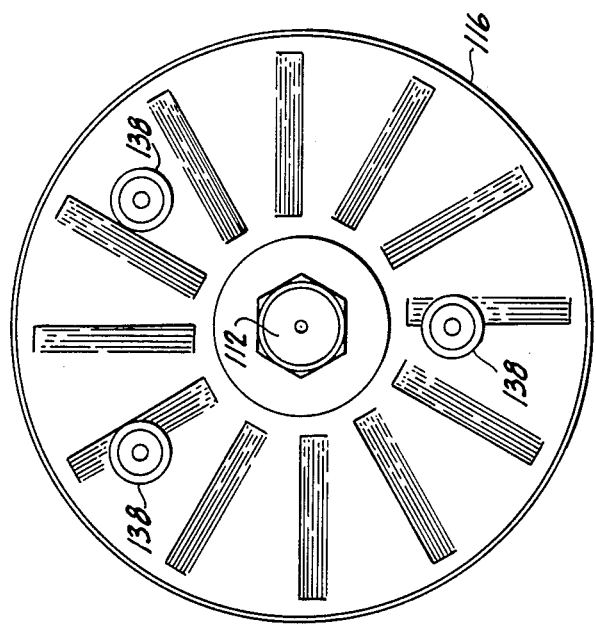
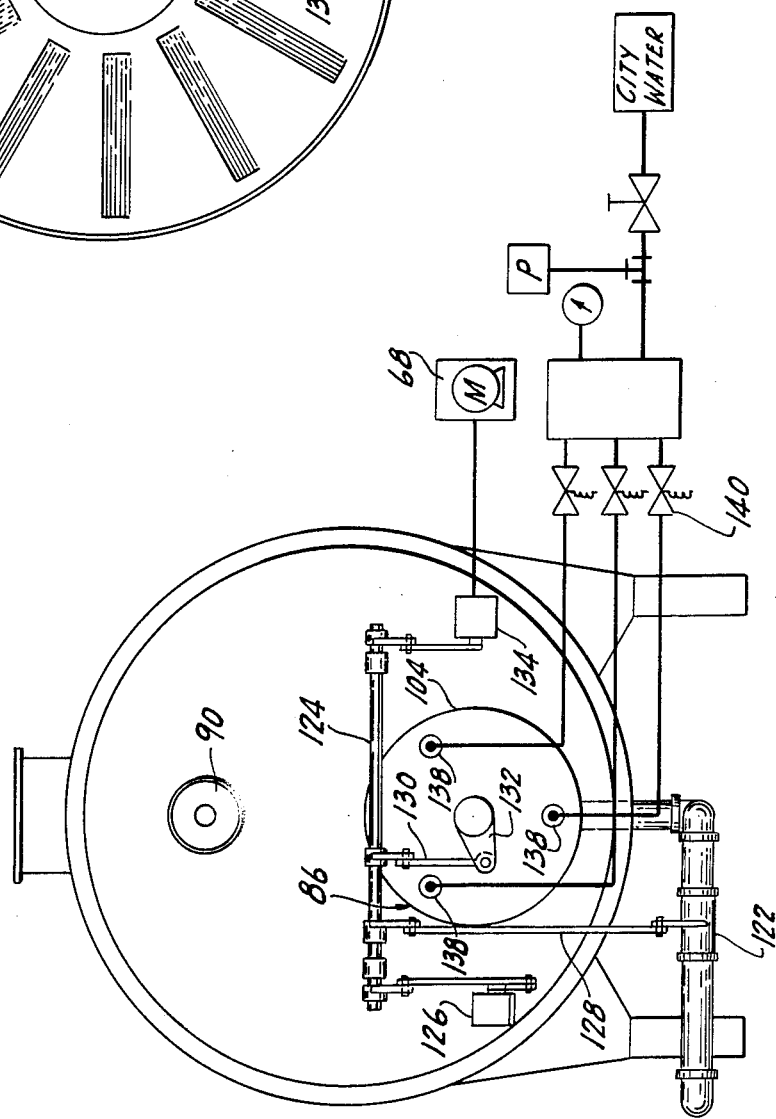

WASTE FUEL COMBUSTION SYSTEM

BACKGROUND OF THE INVENTION

1. Field of the Invention

The present invention relates generally to the art of combustion of waste products, and particularly to the combustion of waste sludge products which have a high ash content, large particle content and high percentage content of water. Even more particularly, the present invention relates to the use of combustion as a viable use of dissolved air flotation sludge from animal rendering and food processing as a fuel.

2. Description of Related Art

A common method of waste water treatment in poultry processing plants, and other processing plants in which animal rendering is performed, is the dissolved air flotation system (DAF). A DAF system separates impurities from the waste water through an agitation and skimming process. A medium sized poultry processing plant, for example, can use up to one million gallons of water per day that must be processed with the DAF system. The contaminants from the water are expelled from the treatment plant as DAF waste sludge. It is not unusual for a one million gallon per day DAF system to generate 10,000 gallons of waste sludge daily.

In the past, this sludge has been spread or applied to land and allowed to dry, thereby becoming a fertilizer, if properly applied. In addition, deep well injection has been used. Problems have arisen however, because of the hazardous waste questions that are involved with placing the sludge into or on the ground. In particular, nitrogen and ammonia build ups when improper application is performed have ruined some tracts of land. Due to tightening governmental restrictions on land applications, deep well injection and other methods previously used to dispose of the waste sludge, animal rendering processing industries are in need of new technologies to address the DAF sludge disposal problem. Experts in the poultry processing industry regard the disposal of DAF waste sludge as one of the major problems facing the industry today and in the future.

The properties of DAF sludge are dependent upon the efficiency of the DAF unit and the type of rendering operation used by the processing plant. Plants can either produce high quality pet food additives from the rendering process, or lower quality feed additives. If poultry plants have on-site rendering, it is desirable to produce the higher quality pet food additives that bring a higher price per pound from their rendering process. By producing pet food quality additives, however, the plant must place tighter restrictions on the materials that can be handled in the rendering process. This in turn increases the quantity of waste in the water stream that must be handled by waste water treatment.

The waste sludge produced by such an operation tends to be much lower in water content than sludge from a plant that is not rendering for pet food additives. This is a result of the increased amount of fat and protein typically found in the waste water that are absorbed in the pet food additive. The sludge typically contains from seventy percent (70%) to ninety percent (90%) water, depending on the efficiency of the DAF system. The remaining portion of the sludge is primarily animal fat with high amounts of nitrogen and solids in the form of ash. In the preferred embodiment of the present invention, the system is capable of processing sludge having a water content up to ninety-nine percent (99%).

At eighty-seven percent (87%) water content, the heating value of the fat portion of the sludge contributes primarily to converting the water portion of the sludge to steam during combustion. In other words, 87% water content is the point where available heat input of the fat in the sludge does not add any net energy to the system. This does not necessarily exclude high water content sludges from combustion systems. In those situations in which high water content sludges are treated, the treatment in one of disposal rather than heat recovery from a fuel.

The inventors are unaware of any incinerator, boiler or other system capable of efficiently treating DAF sludge in an automatic, modulating system on an industrial level. To their knowledge, the only viable methods of large-scale disposal of the DAF sludge have been by land application, deep well injection and in some instances drying and injection into a solid waste incinerator. A system which could efficiently and effectively treat the DAF sludge and provide, in many circumstances, energy to the processing plant would be a significant improvement in the treatment of waste sludges, especially in animal rendering operations.

OBJECTS AND SUMMARY OF THE INVENTION

The primary object of the present invention is to provide a system which is capable of disposing of large quantities of DAF sludge and producing energy therefrom depending on the water content of the sludge.

Another object of the present invention is to provide a system which is easily adapted to meet the air quality and pollution control standards of various states and federal agencies.

A different object of the present invention is to provide a system which is easy to maintain and keep clean without extensive work.

Still a different object of the present invention is to provide a boiler which is capable of handling a sludge which has a high ash content, large particulate content and a high percentage content of water.

Yet another object of the present invention is to permit modulating of DAF sludge and gas to provide steam which may vary in demand.

How these and other objects of the invention are accomplished will be described in the following detailed description of the preferred embodiment, taken in conjunction with the drawings. Generally, however, they are accomplished by providing a system for utilizing a fuel having a high ash content, water content in excess of 50% and large particles of combustibles which includes a holding tank for the fuel. The fuel sludge is circulated from the bottom to the top of the holding tank to maintain the consistency of the fuel. A metered portion of the fuel in the circulating system is removed by a metering pump, strained and fed to a combustion device. The combustion device is a fire tube boiler for generating steam and includes a furnace tube insulated with refractory material extending for its entire length. The system mixes a preselected amount of atomized fuel with combustion air and natural gas. Special ash and particulate accumulation means in the combustion device are also provided. The boiler has a water spraying system in its combustion chamber to reduce combustion temperature and increase water content of the combustion mixture based on the temperature of the combustion gases at the end of the furnace tube. Finally, when the boiler is shut off, a bypass circuit returns unburned fuel to the holding tank. Various parts of the system are then air or water purged. Other ways in which the objects of the invention could be accomplished will become apparent to those skilled in the art after reading and understanding the present specification.

BRIEF DESCRIPTION OF THE DRAWINGS

FIG. 2 is a cross-sectional view of a combustion device used in the system of FIG. 1.

FIG. 3 is a partial schematic and partial plan view of the fuel mixing apparatus for the combustion device of FIG. 2.

FIG. 4 is a cross-sectional view of the fuel, combustion air and water delivery means of the combustion device of FIG. 2.

FIG. 5 is a detailed plan view of the gun used to deliver DAF sludge to the combustion chamber of the combustion device.

DESCRIPTION OF THE PREFERRED EMBODIMENT

Figure 1:
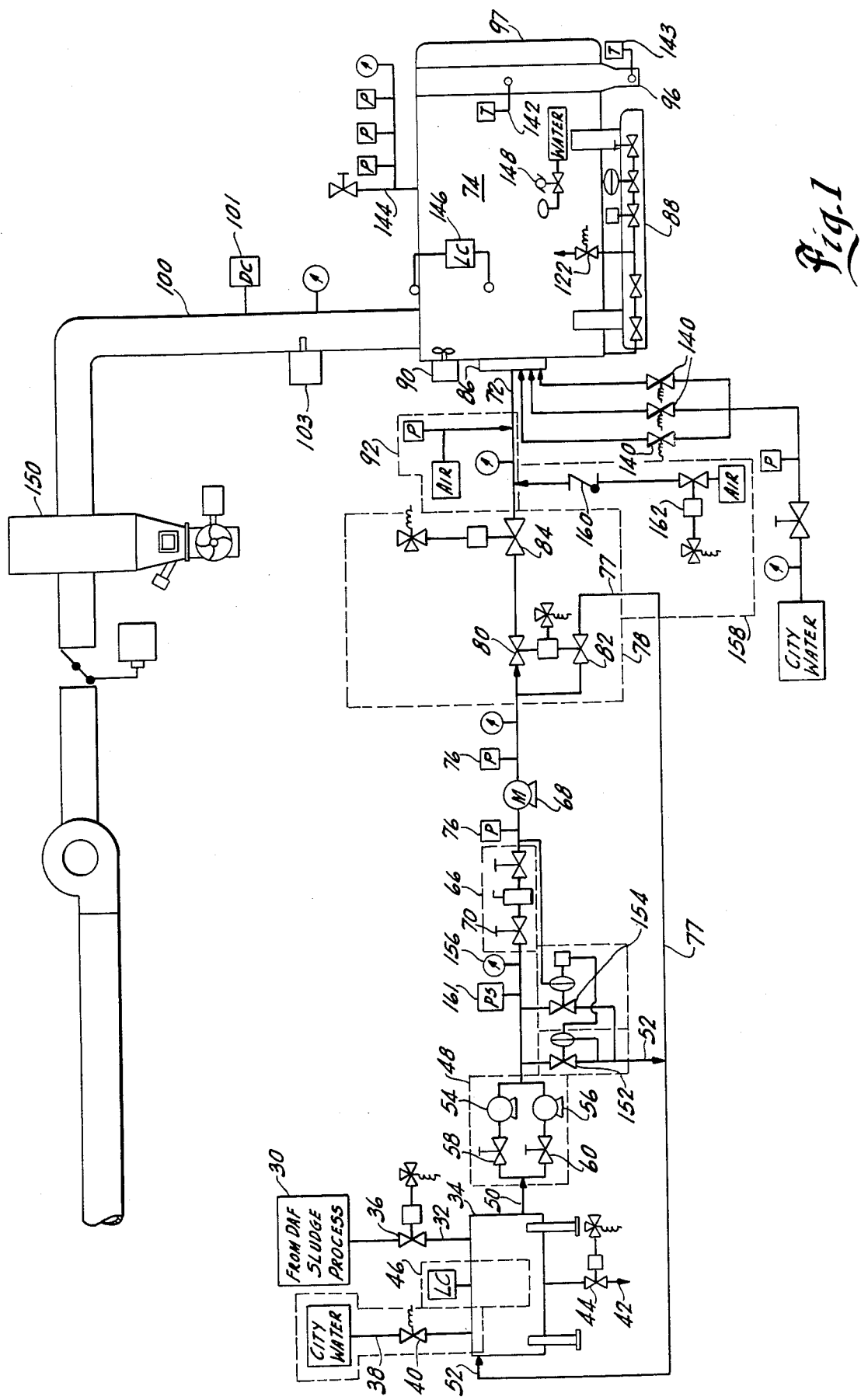
FIG. 1 is a schematic view of a waste fuel combustion system according to the present invention.

The preferred embodiment of the overall system of the present invention is shown in FIG. 1. A dissolved air flotation ("DAF") system (not shown) is designed to treat waste water in an animal rendering operation such as a poultry processing plant. DAF waste sludge is carried from a main DAF storage tank 30 via pipe 32 to a DAF day tank 34. Access to day tank 34 is regulated by pneumatic valve 36.

A water purge supply 38 is also fed into the day tank 34 for maintenance and cleaning of the tank when emptied. The water supply 38 can easily be provided by the local water service, with access being controlled by valve 40. A drain 42 is also provided for emptying either untreated sludge or water from cleaning. Drain 42 is controlled by valve 44.

The level of DAF sludge in day tank 34 at any given time is monitored by a level control 46 which keeps the level within a preselected range. This level range is maintained even though the sludge is regularly recirculated by recirculation system 48. System 48 is composed of outlet and return pipes 50, 52 and recirculation pumps 54, 56 which have manual valves 58, 60 in communication therewith. Outlet pipe 50 is connected to day tank 34 at its bottom and return pipe 52 returns DAF sludge to a level at the top of the tank 34. This recirculation of the DAF sludge being fed to be burned ensures that water content and sludge consistency remain relatively constant. Unlike some other fuels, heating only promotes coagulation and clogging, so circulation is the only method for maintaining consistency.

The recirculation system 48 also provides a positive pressure through a duplex strainer 66 to a variable-speed metering pump 68. Strainer 66 removes larger particles that downstream elements of the overall system cannot handle. Because strainer 66 consists of two strainer elements in parallel, a manual valve 70 on one or the other strainer element can be closed without having to shut down processing, thus permitting simultaneous cleaning and operation.

A relief pressure regulator 152 located downstream of the recirculation system 48 prevents deadheading of the pumps 54, 56; that is, regulator 152 ensures that an effectively infinite back pressure is not created against the pumps 54, 56 that would cause their breakdown. A second pressure regulator 154 is mounted to regulate the intake pressure of the metering pump 68. In the configuration shown in FIG. 1, pressure regulator 154 measures the pressure at a point between metering pump 68 and strainer 66 resulting in a comparison of that pressure and the pressure measured by pressure gauge 156. This comparison will allow the system to determine whether there is clogging in the strainer 66, the result of which is a warning alarm actuated by pressure switch 161.

Metering pump 68 provides a preselected flow of DAF sludge in a manner to be described below. Pressure switches 76 assist in ensuring that the flow of sludge is properly regulated. The DAF sludge passes from the metering pump 68 through pipe 72 and goes to the sludge combustion means 74. Between combustion means 74 and metering pump 68, a safety system 78 must be passed. If for any reason the downstream elements cause a shut down of the processing, linked safety valves 80, 82, 84 cause the bypass of the supply of sludge from pipe 72 back to the day tank 34 via bypass pipe 77 which feeds into return pipe 52. Valves 80, 82 are linked so that when one is open, the other is closed and vice versa. Furthermore, valve 84 assumes the same position as valve 80. In the preferred embodiment, all three of the safety valves 80, 82, 84 are pneumatically controlled.

In the preferred embodiment, the combustion means 74 is a boiler of novel construction and operation shown in FIG. 2. Boiler 74 has a feeder arrangement 86 which controls mixing of DAF sludge from pipe 72 with atomizing air from unit 92, natural gas from the natural gas train 88, and combustion air from blower 90. As seen in FIG. 2, boiler 74 also has a unique combustion chamber 94 that terminates with an ash hopper 96 and turnaround chamber 98. The fire tubes 102 allow for three full tube passes and terminate in a flue gas stack 100 that has attachments, including a draft control 101, oxygen monitor 103 and and particulate collector 150 to ensure that the emissions from boiler 74 comply with state and federal regulations for air pollution.

Feeder arrangement 86, shown in detail in FIG. 3, sets the desired mixing and burning conditions and automatically and regularly monitors them. Mounting plate 104 on the front of boiler 74 has a central hole and three equidistantly spaced holes around it. Pipe 72 feeds DAF sludge through plate 104 to a coaxial gun 106 specially designed to accomodate the high particulate content of the sludge. In gun 106, the sludge passes through the inner tube 108 while atomizing air from unit 92 passes through space 107 between inner tube 108 and the outer tube 110 as seen in cross-sectional detail in FIG. 5. At tip 112 the air and sludge are mixed to create a finer mist of sludge. Tip 112 is designed to allow passage of particles up to 5/16 inch in diameter. The atomized sludge is propelled in a swirl into the center of combustion chamber 94.

As seen in FIG. 2, combustion air from blower 90 surrounds radial damper 114 which is controlled in a manner to be described below. The combustion air enters the combustion chamber 94 through diffuser 116 which is mounted around the gun 106. The swirling effect of the diffuser 116 shown in FIG. 4 on the combustion air assists in mixing the air and atomized sludge for effective burning. Natural gas is also mixed to achieve the desired burning conditions. Train 88 feeds natural gas to the annular cavity 118 which surrounds the gun 106 and diffuser 116. Gas is directed into the combustion area through ports 120, the amount being controlled by butterfly valve 122.

Mixture of the atomized sludge, combustion air and natural gas is controlled by a jackshaft 124 mounted on plate 104 seen in FIG. 3. Jackshaft 124 is adjusted by a modulating motor 126 which receives signals from a control panel (not shown). The control panel receives signals from oxygen sensor head 103 which adjusts burning conditions based on oxygen content of exhaust gases entering stack 100, as seen in FIG. 1. Linkage 128 connects jackshaft 124 and butterfly valve 122 to regulate the inflow of natural gas for combustion mixing. A second linkage 130 is connected to arm 132. Arm 132 controls rotation of the radial damper 114 and thus combustion air flow through diffuser 116. Finally, signal generator 134 on jackshaft 124 regulates the flow of DAF sludge by sending signals to the metering pump 68. Therefore, by setting the desired burning conditions at a central control location, the boiler 74 will operate at the level necessary for efficient burning of the DAF sludge, the mixture of the combustion elements being controlled by the jackshaft 124. This system allows the boiler to be operated at a preselected firing rate or in an automatic mode where the position of the jackshaft 124 is controlled by steam pressure.

The high ash content of the DAF sludge means that "slagging" or ash fusion, is a problem if temperatures are too high in the combustion chamber 94. When this occurs, the bricking 136 of the combustion chamber 94 can be permanently damaged. Because the fat and water content of the DAF sludge can change quickly, some means is needed to bring the temperature down if the combustion temperature rises to high. Therefore, as seen in FIGS. 2, 3 and 4, three water nozzles 138 are provided adjacent and parallel to the gun 106 in the preferred embodiment. The water nozzles 138 operate sequentially; that is, if the temperature rises beyond an acceptable maximum, only one nozzle 138 is activated. If the temperature again rises too much, another nozzle 138 begins spraying water to raise the water content of the combustion mixture and reduce the temperature. The water nozzles 138 are controlled by individual valves 140 shown in FIG. 1. The temperature is monitored near the rear of the combustion chamber 94 by thermocouple 142 and in ash hopper 96 by thermocouple 143 to estimate ash buildup.

The combustion chamber 94 and furnace are also of unique design due to the unusual composition of the sludge. To completely burn the sludge, a higher temperature and longer residence time of sludge in the combustion area are needed. To accomplish this, the combustion chamber 94 is lined with bricking 136 for its entire length. In earlier boilers, the bricking has typically extended only three units into the chamber 94. By increasing the bricking, a smaller temperature drop is experienced and the effective length of the combustion chamber 94 is dramatically increased.

As the mixture finishes its burning, the ash is propelled to the end of chamber 94. Turnaround chamber 98 at the end of chamber 94 creates a large dead zone. This dead zone causes the ash to drop out of the hot gases and into ash hopper 96. Therefore, large quantities of ash are removed from the gases early. Ash hopper 96 can be opened and emptied without opening the entire rear door 97 of the boiler 74.

The gases then travel back through fire tubes 102 for three additional passes. During the four passes, the heat from the gases is transferred to water that is circulated around the fire tubes 102, converting the water to steam. The gases exit through stack 100 while the steam exits through steam outlet 144 seen in FIG. 1. The amount of steam produced is regulated by controlling heat input to the boiler and thus the temperature and heat transfer characteristics of the gases in the fire tubes 102. Feed water valve 148 with level control 146 ensure proper water level in the boiler at all times.

Once the gases have entered the stack 100, they are treated to remove particulate matter in collector 150. Other aspects of the exhaust system of the boiler, like collector 150, are generally well known and will not be discussed in further detail.

Because the gun 106 handles material that could easily clog the gun 106 or other elements of the system, an air purge unit 158 is provided. Whenever the system is shut down for cleaning or another reason, air is forced through check valve 160 once valve 84 is closed and valve 162 is opened. This air moves under pressure through pipe 72, gun 106 and tip 112, thereby cleaning these elements before any of the DAF sludge can accumulate and coagulate.

OPERATION

In the system of FIG. 1, DAF sludge is generated by the animal rendering operation of a processing plant in the preferred embodiment. This sludge is stored in tank 30 until needed by the combustion system for destruction and energy recovery. The DAF sludge usually varies in water content from 70% to 90% depending on the DAF system efficiency.

Level controller 46 controls valve 36 that taps from the main storage tank 30 to keep the level in day tank 34 within preselected limits. With day tank 34 filled to within its limits, the sludge is circulated through recirculation circuit 48 to keep the water content and consistency of the sludge as constant as possible and prevent stratification.

At startup, the boiler is warmed up firing natural gas only. After the boiler is at its operating pressure, it is shut down and restarted firing DAF waste sludge from day tank 34 simultaneously with natural gas from the gas train 88. The maximum particle size is limited by the duplex strainer 66.

Metering pump 68 keeps a regulated flow of sludge determined by the operation and position of jackshaft 124 coming into the boiler 74 through safety valve system 78. Upon reaching the coaxial tubular gun 106, the sludge is atomized with air from unit 92 in tip 112. The atomized sludge is sprayed from the gun 106 into combustion chamber 94 where it is mixed and burned with combustion air from diffuser 116 and natural gas emitted from ports 120.

During combustion, the temperature of the combustion chamber can reach 3000 degrees Fahrenheit. Because of the improved temperature/residence characteristics of the refractory bricking 136, the combustion temperature will only drop approximately 400 degrees Fahrenheit instead of the typical 1200 degrees Fahrenheit as is found in earlier boilers. As stated above, this refractory bricking 136 is needed to completely burn material like the DAF sludge which has a considerably higher water and ash content and typically lower flame temperature than most combustion materials.

Ash from the sludge drops into hopper 96 from the turnaround 98, leaving extremely hot gases to pass on through three sets of fire tubes 102, transferring the heat to water, thus converting it to steam. Exhaust gases exit through the stack 100 and are treated to comply with emission standards.

If the temperature measured by thermocouple 142 indicates possible ash fusion conditions, due for example to a suddenly lower water content in the DAF sludge, one or more of the water nozzles 138 operates to increase the water content of the combustion mixture and decrease the temperature in the combustion chamber 94.

When the boiler 74 is shut down, various components can be easily cleaned. The air purge system 158 cleans the gun 106 every time the boiler 74 ceases operation as explained above. This occurs regardless of the duration of the shut down of the boiler. For longer shut downs, a water purge of the entire system is used to remove DAF sludge from the system.

When a shut down is anticipated, the water valve 40 is opened and DAF valve 36 is closed. Thus the day tank 34 begins to receive water rather than the DAF sludge. The system then operates in generally the same way, except that the water content of the fuel coming into the boiler 74 through pipe 72 is steadily rising. Jackshaft 124 adjusts for this condition until firing of the boiler 74 ceases. This method of purging is actually a progressive dilution of the sludge so as to gradually clean the main supply pipes 50, 72 and recirculation and bypass pipes 52, 77 respectively. Once the boiler 74 is shut down, accumulated ash in hopper 96 may be removed by opening access door 163.

It should be obvious to one skilled in the art after reading the present specification that a wide variety of modifications can be made to the combustion system described above. For example, othr components and methods may be used to treat the exhaust gases as they leave the stack to make sure the treament facility complies with state and federal clean air provisions. In addition, it is conceivable that different combustion means utilizing the same basic principles as the boiler disclosed herein could be employed to accomplish the same task. Accordingly, the present invention is not to be limited by the description or illustration of certain specific disclosed embodiments but is to be limited solely by the scope of the claims which follow.

We claim:

1. A fire tube boiler for generating steam, said boiler comprising:
   a front head;
   a rear head;
   a furnace tube extending between said front and rear heads for nearly the entire length therebetween, the entire length of said furnace tube being a combustion chamber and the entire length of said furnace tube being insulated with refractory material so as to maintain a preselected temperature range and extended linear flow path for materials being combusted; and
   wherein said front head includes
      means for delivering a preselected amount of a waste material having high ash content, water content in excess of 50% and up to 99% and large particles of solid combustible material to said combustion chamber;
      means for delivering combustion air to said combustion chamber;
      means for delivering a primary combustion fuel to said combustion chamber;
      means for mixing the waste, combustion air and the fuel in proper proportions for complete combustion throughout the firing rate of said boiler; and
   wherein said furnace tube is capable of maintaining sufficient velocity of said ash content and said large particles of said waste so as to keep said ash and particles entrained within combustion gases of said furnace tube.

2. The boiler as recited in claim 1 wherein said rear head is formed so that said furnace tube terminates with a large space designed to create a dead zone to allow particulates and ash to fall as they pass into the dead zone.

3. The boiler as recited in claim 2 wherein the bottom of said rear head includes a hopper below the dead zone for accumulating ash and particulates that have fallen from said furnace tube.

4. The boiler as recited in claim 1 wherein said mixing means further includes:
   temperature measuring means at the end of said furnace tube;
   oxygen measuring means designed to measure the oxygen content of the gases produced during combustion to determine the efficiency of said boiler;
   means to adjust the mixing means to maximize consumption of the fuel by combustion.

5. The boiler as recited in claim 4 further comprising water spraying means for introducing water into the mixture of the waste, combustion air and fuel to increase the water content of the mixture, thereby reducing the combustion temperature of the mixture, operation of said spraying means being controlled by said temperature measuring means.

6. The boiler as recited in claim 1 further comprising an exhaust stack adjacent the top of said front head and a series of tubes connecting the end of said furnace tube and said stack, wherein said series of tubes longitudinally passes from said furnace tube through said front head, then through said rear head and then to said stack.

7. The boiler as recited in claim 1 wherein said waste delivering means includes means for atomizing said waste with air before being mixed with the combustion air and the fuel.

8. The boiler as recited in claim 1 wherein said delivering means is capable of delivering a waste having particles up to 5/16" in diameter.

9. The boiler as recited in claim 5 wherein the fuel is natural gas.

10. A fire tube boiler for generating steam, said boiler comprising:
    a front head;
    a rear head;
    a furnace tube extending between said front and rear heads for nearly the entire length of said boiler, the entire length of said furnace tube being a combustion chamber and the entire length of said furnace tube being insulated with refractory material so as to maintain a preselected temperature range and extended linear flow path for materials being combusted and wherein said furnace tube is capable of maintaining sufficient velocity of said ash content and large particles of waste so as to keep said ash and particles entrained within combustion gases of said furnace tube;
    wherein said front head includes
       means for delivering to said combustion chamber a preselected amount of waste having a high ash content, water content in excess of 50% and up to 99% and large particles of solid combustible material;

means for delivering combustion air to said combustion chamber;

means for delivering natural gas to said combustion chamber; and means for mixing the waste, combustion air and natural gas, said waste delivering means including means for atomizing said waste with air before being mixed with the combustion air and natural gas; and wherein said rear head is formed so that said furnace tube terminates with a large space designed to create a dead zone to allow particulates and ash to fall as they pass into the dead zone and wherein the bottom of said rear head includes a hopper below the dead zone for accumulating ash and particulates that have fallen from said furnace tube.

11. The boiler as recited in claim 10 wherein said mixing means further includes:

temperature measuring means at the end of said furnace tube;

oxygen measuring means designed to measure the oxygen content of the gases produced during combustion to determine the efficiency of said boiler;

means to adjust the mixing means to maximize consumption of the waste by combustion; and wherein said boiler further comprises water spraying means for introducing water into the mixture waste combustion air and natural gas to increase the water content of the mixture, thereby reducing the combustion temperature of the mixture, operation of said spraying means being controlled by said temperature measuring means.

12. The boiler as recited in claim 10 further comprising an exhaust stack adjacent the top of said front head and a series of tubes connecting the end of said furnace tube and said stack, wherein said series of tubes longitudinally passes from said furnace tube through said front head, then through said rear head and then to said stack.

13. A system for disposing of a waste having a high ash content, water content in excess of 50% and up to 99% and large particles of combustibles, said system comprising:

(a) means for holding a preselected amount of said waste;

(b) means for regularly circulating said waste from the bottom to the top of said holding means to maintain the consistency of said waste;

(c) means for removing a preselected portion of said waste from said circulation means;

(d) a combustion device, having a front head; a rear head; a furnace tube extending between said front and rear heads for nearly the entire length therebetween, the entire length of said furnace tube being a combustion chamber and the entire length of said furnace tube being insulated with refractory material so as to maintain a preselected temperature range and extended linear flow path for materials being combusted; and wherein said front head includes means for delivering a preselected amount of a waste material having a high ash content, water content in excess of 50% and up to 99% and large particles of solid combustible material to said combustion chamber;

means for delivering combustion air to said combustion chamber;

means for delivering a primary combustion fuel to said combustion chamber;

means for mixing the waste, combustion air and the fuel in proper proportions for complete combustion throughout the firing rate of said boiler; and wherein said furnace tube is capable of maintaining sufficient velocity of said ash content and said large particles of said waste so as to keep said ash and particles entrained within combustion gases of said furnace tube; and (e) waste delivering means to deliver said waste from said removal means to said combustion means.

14. The system as recited in claim 13 wherein said removal means includes a metering pump designed to provide said waste delivering means with a regulated amount of said waste based on the firing rate of said combustion device.

15. The system as recited in claim 13 wherein said waste delivering means includes bypass means designed to convey said waste from said waste delivering means back to said holding means whenever said combustion device ceases operation.

16. The system as recited in claim 13 wherein said waste delivering means includes a dual strainer for removing particles having diameters in excess of a preselected maximum from said waste.

17. The system as recited in claim 13 wherein said furnace tube of said boiler terminates with a large space in said rear head to create a dead zone and thereby allow particulates and ash to fall into a hopper below the dead zone having a door to provide accessability for removing ash and particulates and for cleaning of said rear head.

18. The system as recited in claim 13 wherein said mixing means of said boiler includes temperature measuring means at the end of said furnace tube, oxygen measuring means designed to measure the oxygen content of the gases produced during combustion to determine the efficiency of said boiler, means to adjust the mixing means to maximize consumption of said waste by combustion and spraying means for introducing water into the mixture of said waste, combustion air and said fuel to increase the water content of the mixture, thereby reducing the combustion temperature of the mixture, operation of said spraying means being controlled by said temperature measuring means.

19. The system as recited in claim 13 wherein said waste delivering means of said boiler includes means for atomizing said waste with air before being mixed with the combustion air and said fuel and is capable of delivering said waste having particles up to 5/16" in diameter.

20. The system as recited in claim 19 wherein said fuel is natural gas.

21. A system for disposing of a waste having a high ash content, water content in excess of 50% and up to 99% and large particles of combustibles, said system comprising:

(a) means for holding a preselected amount of the waste;

(b) means for regularly circulating the waste from the bottom to the top of said holding means to maintain the consistency of the fuel;

(c) means for removing a preselected portion of the waste from said circulation means;

(d) a fire tube boiler having a front head, a rear head and a furnace tube extending between said front and rear heads and a furnace tube extending between said front and rear heads for nearly the entire length of said boiler, the entire length of said furnace tube being a combustion chamber and the entire length of said furnace tube being insulated with refractory material so as to maintain a preselected temperature range and extended linear flow path for materials being combusted and wherein said furnace tube is capable of maintaining sufficient velocity of said ash content and large particles of waste so as to keep said ash and particles entrained within combustion gases of said furnace tube;

wherein said front head includes
means for delivering to said combustion chamber a preselected amount of waste having a high ash content, water content in excess of 50% and up to 99% and large particles of solid combustible material;
means for delivering combustion air to said combustion chamber;
means for delivering natural gas to said combustion chamber; and
means for mixing the waste, combustion air and natural gas, said waste delivering means including means for atomizing said waste with air before being mixed with the combustion air and natural gas; and wherein said rear head is formed so that said furnace tube terminates with a large space designed to create a dead zone to allow particulates and ash to fall as they pass in to the dead zone and wherein the bottom of said rear head includes a hopper below the dead zone for accumulating ash and particulates that have fallen from said furnace tube;and (e) waste delivering means to deliver the waste from said removal means to said boiler.

22. The system as recited in claim 21 wherein said removal means includes a metering pump designed to provide said second delivering means with an amount of waste based on the firing rate of said boiler; and
wherein said second delivering means includes:
bypass means designed to convey waste from said delivering means back to said holding means whenever said boiler ceases operation; and
a dual strainer for removing particles having diameters in excess of a preselected maximum from the waste.

23. The system as recited in claim 22 wherein said furnace tube of said boiler terminates with a large space in said rear head to create a dead zone and thereby allow particulates and ash to fall into a hopper below the dead zone having a door to provide accessability for removing ash and particulates and for cleaning of said rear head.

24. The system as recited in claim 22 wherein said mixing means of said boiler includes temperature measuring means at the end of said furnace tube, oxygen measuring means designed to measure the oxygen content of the gases produced during combustion to determine the efficiency of said boiler, means to adjust the mixing means to maximize consumption of the waste by combustion and spraying means for introducing water into the mixture of waste, combustion air and natural gas to increase the water content of the mixture, thereby reducing the combustion temperature of the mixture, operation of said spraying means being controlled by said temperature measuring means.

25. The system as recited in claim 22 wherein said waste delivering means of said boiler includes means for atomizing said waste before being mixed with the combustion air and natural gas and is capable of delivering waste having particles up to 5/16" in diameter.

* * * * *